Nov. 11, 1952   C. P. ANDERSON   2,617,904
VARIABLE-SPEED GOVERNOR

Filed May 8, 1950   2 SHEETS—SHEET 1

INVENTOR
Carl P. Anderson

By *Strauch, Nolan & Diggins*
Attorneys

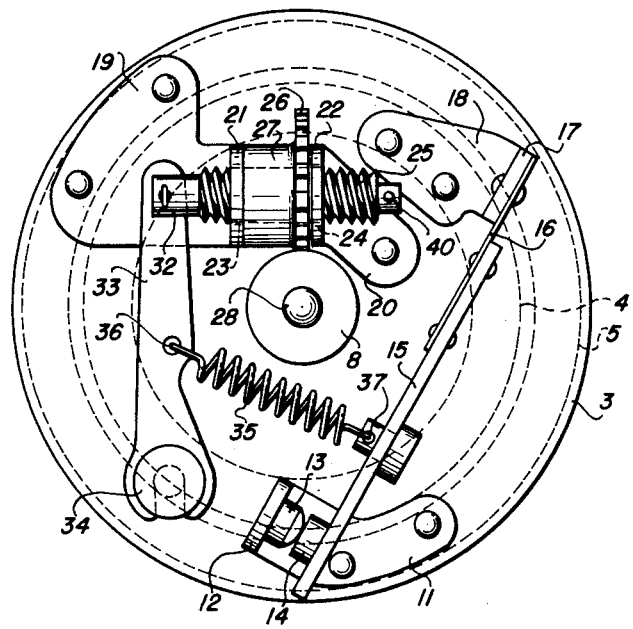
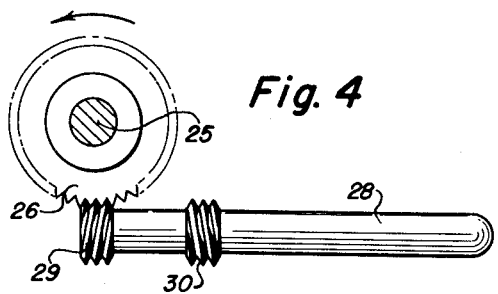
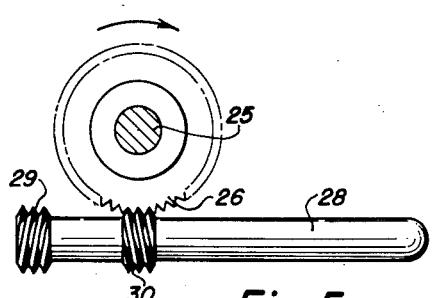

Patented Nov. 11, 1952

2,617,904

UNITED STATES PATENT OFFICE 2,617,904

VARIABLE-SPEED GOVERNOR

Carl P. Anderson, Highland Park, Ill., assignor to Kleinschmidt Laboratories, Inc., Highland Park, Ill., a corporation of Delaware Application May 8, 1950, Serial No. 160,687

11 Claims. (Cl. 200—80)

This invention relates to motor speed governors, and more particularly to the type of governor in which a driven control member affected by centrifugal force controls means adapted to maintain the associated motor at a fixed speed by regulating the power supply of the motor.

It is well known that as the load on an electric motor is reduced the motor has a tendency to increase its speed. In certain arts it is desirable to maintain a motor at a fixed speed regardless of variations in the load. My invention relates to a governor which may be adjusted to maintain the motor at any one of a variable number of speeds and which controls the speed of the motor by regulating the power supply for the motor. This variable speed governor in its preferred embodiment comprises a flywheel or rotatable disk driven by the motor, which carries a pair of contacts, one of which is mounted on a movable arm affected by centrifugal force. At speeds below the ultimate set speed the contacts are in engagement but as the motor speed increases the centrifugal force increases and when the motor speed exceeds the set speed the centrifugal force is sufficient to separate the movable contact from the fixed contact. The power supply of the motor is thereupon regulated by the inclusion of an electrical resistance which causes the speed of the motor to be reduced until the contacts again come into engagement to close a shunt path or short circuit which disconnects the resistance from the power supply circuit. The parts are so balanced and arranged that the least increase is at once compensated for by the inclusion of the resistance in the power supply circuit with a consequent reduction of motor speed to hold the motor at the desired set speed.

Governors have been provided on such motors in the past with adjusting or regulating means which may be adjusted to vary the speed at which the associated motor will be maintained by the governor, and these regulating means have included means for increasing or decreasing the tension on the movable contact, means for changing the initial relationship of the contacts by changing the setting of the fixed contact, and various other expedients. My invention relates specifically to a unique and novel construction varying the tension on the movable contact so that a greater or lesser amount of centrifugal force is required to move it away from the fixed contact.

Many of these known governors for adjusting and controlling the speed of a rotating member by electrical control have made use of centrifugal force balanced against an adjustable spring to control the opening and closing of electrical contacts in circuit with the power supply of the driving motor. Various methods are used to adjust the tension of the spring to obtain control of the rotating member at desired speeds without first stopping the motor or rotating member in order that such adjustment may be made within the governor assembly.

One method is to provide a disc having a screw thread mounting on an axially movable shaft to which the adjusting spring is connected. The disc in this case is made large enough to extend on both sides of the governor assembly. To adjust this type of governor it is necessary to provide stationary levers having pads that can be brought into contact with the adjusting disc on both sides of the governor assembly. In practice it has been found that in this type of governor the face of the disc develops considerable wear, the arrangement of parts does not lend itself to the construction of a compact unit and further it is difficult to obtain a fine increment of adjustment by this construction.

Another method to obtain adjustment of the governor spring tension is to place the spring outside the rotating governor assembly for biasing a contact carrying lever that is pressed against a lever within the rotating governor assembly at the center of rotation, as in the Chaplin Patent No. 1,487,314. This construction has not been satisfactory since wear will develop at the point of contact of the stationary and rotating levers which prevents maintaining a fixed speed over a period of time.

These known governors, besides the above objections, comprise a large number of parts so that they are difficult to build and service. The present invention provides a novel simple governor construction of few parts that is inexpensive to build and capable of direct fine reproducible adjustment. In its preferred embodiment to be later described in detail, the spring tension on the movable contact arm is variable in small increments with little or no wear on the associated parts, so that any of a large number of speeds may be selected and maintained.

The principal object of my invention is to provide a variable speed governor having a novel arrangement for adjusting a control member so as to maintain an associated motor at any one of a variable number of speeds.

A further object of my invention is to provide in a variable speed governor for maintaining a motor at any one of a variable number of speeds novel regulating mechanism which may be adjusted while the motor is in operation.

It is a further object of the invention to provide a novel speed governor for an electric motor wherein energy derived from rotation of the motor shaft is applied to effect small increment adjustments to a movable contact arm in a control circuit for the motor.

A further object of the invention is to provide a speed governor for a motor wherein a spring biased centrifugal switch rotated by the motor embodies a novel adjustment mechanism for selecting a desired motor speed.

It is still a further object of the invention to provide a novel worm and gear fine adjustment mechanism for the movable contact carrying arm of a centrifugal switch.

A further object of the invention is to provide a centrifugal governor having a movable contact and an associated normally disconnected adjustment member.

Other objects will appear in the following description and in the appended claims.

In the drawings like reference characters in the various views indicate like parts, and Figure 1 illustrates a side view of a governor according to one embodiment of my invention with certain parts in section and others cut away for the sake of clearness of illustration;

Figure 3 is an end elevation of the governor of Figure 1 with certain parts removed to show details of the contacts and adjusting means;

Figure 4 is a fragmentary view illustrating the manual adjustment member in one operative position;

Figure 5 is a similar fragmentary view illustrating the manual adjustment member in its other operative position; and Figure 6 is a diagrammatic view illustrating the power supply circuit arrangement of the preferred embodiment of my invention.

Figure 2:
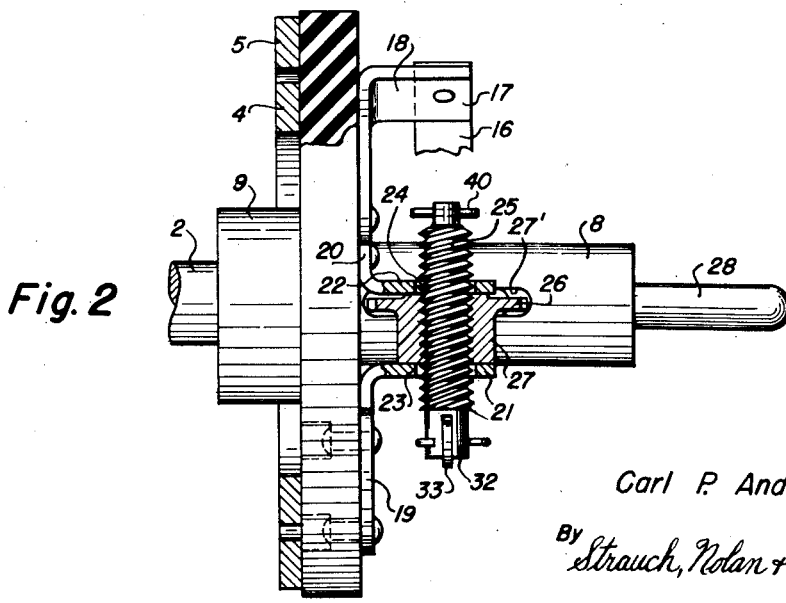
Figure 2 is a plan view partly in section of part of the governor of Figure 1, illustrating particularly the worm wheel and adjustment details.

Referring to the drawings, an electrical motor 1 is provided with a rotatably driven shaft 2 to which is secured the variable speed governor of my invention. A flywheel or support disc 3 composed of a material which is a non-conductor of electricity carries radially spaced motor brush rings 4 and 5 (Figure 2) engaged by the brushes 6 and 7 of the motor 1 to control an operating circuit of the motor.

A hollow shaft 8 is provided with a collar portion 9 which is rigidly secured upon motor shaft 2 as by a set screw 10 so that shaft 8 is an effective extension of shaft 2. The disc 3 is fixed upon shaft 8 in any suitable manner and on the side opposite rings 4 and 5 carries a support 11 having an upturned portion 12 to which is secured a fixed contact 13. A movable contact 14 is mounted on a contact carrying arm 15 riveted or similarly fastened to one end of a flat spring member 16 that has its other end fixed upon the upturned portion 17 of a support 18 secured to the disc 3. Contacts 13 and 14 are suitably connected by conductors to the respective motor brush rings.

Supports 19 and 20 are fixed on the disc 3 and have upturned portions 21 and 22, respectively, which are provided (Figure 2) with aligned orifices 23 and 24 that rotatably and slidably support a screw threaded member 25. An adjustment control gear 26 having a bore in screw threaded engagement with the member 25 has a hub 27 extending between the upturned support portions 21 and 22 so that gear 26 is incapable of axial movement.

Gear 26 is mounted so that its vertical plane is at right angles to the shaft 8 and it is vertically aligned with the axis of shaft 8. Hollow shaft 8 has a cut-away portion or axial slot 27' into which the lower peripheral edge of gear 26 projects. Within hollow shaft 8 is a bore rotatably and slidably mounting a gear carrier pin 28 having spaced enlarged portions upon which are formed worm gears 29 and 30. The worm gears 29 and 30 are cut with opposite threads, i. e. one has a left hand thread and the other a right hand thread, for the purpose of driving the gear 26 in a clockwise or counterclockwise direction when associated therewith as shown in Figs. 4 and 5 of the drawing and as will be more fully explained hereinafter.

Figure 1:
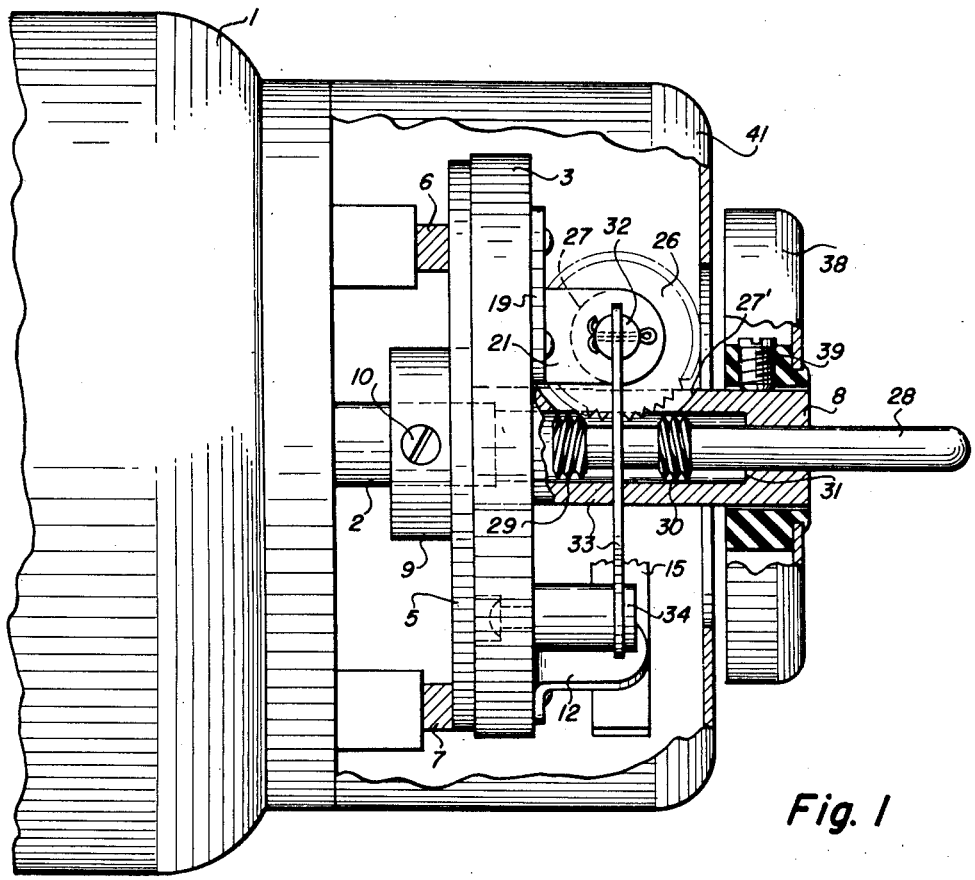

The pin 28 is freely slidably and rotatably mounted within the bore of hollow shaft 8 so that it may rotate or be moved axially therein. The hollow shaft 8 has an end wall 31 provided with an orifice of a size to permit the end of pin 28 to pass through slidably but which will not permit the passage of worm gear 30 when pin 28 is moved to the right in Figure 1. Movement of pin 28 to the left in Fig. 1 is arrested by the end of the pin 28 striking the motor shaft 2.

Pin 28 therefor is mounted for limited axial travel within shaft 8. Preferably when gear 30 has been pulled into abutment with wall 31 the worm 29 is meshed with gear 26, and when pin 28 is pushed into contact with the end of shaft 2 worm 30 is meshed with gear 26, so that the two operative positions of the pin are defined by fixed limit stops. One end 32 of screw threaded adjustment member 25 is pivotally secured to a tensioning arm 33 which has its other end rotatably supported upon a stud 34 secured to the rotatable disc 3. A tensioning spring 35 has one of its ends secured to the tensioning arm 33 at 36 and its other end secured to the contact carrying arm 15 by a member electrically insulated from contact carrying arm 15 at 37.

An end cover 38 is secured to shaft 8 as by a set screw 39 and co-operates with a stationary cover 41 fastened to the housing of motor 1 to shield and protect the governor parts. The end cover 38 rotates with the shaft 8 and a speed target consisting of several spots of a contrasting color may be applied thereto for purposes which will appear hereinafter.

As shaft 8 is rigidly secured to motor driven shaft 2, it will rotate with shaft 2 and all the parts supported on the shaft 8 will likewise rotate. This rotating movement creates centrifugal force which increases with acceleration of the motor shaft until it overcomes the mass of the movable contact 14 and carrying arm 15 and the tension of spring 35 to separate contacts 13 and 14 and thereby remove the shunt (Fig. 6) from around the resistance R to include the resistance R in the power supply circuit of the motor 1 and thereby decrease the speed of the motor until the decreasing centrifugal force is overcome by the tension of the spring 35, and contact 14 again engages contact 13 to reestablish the shunt circuit and remove the resistance R from the motor control circuit. Condenser C bridges contacts 13 and 14 for the usual spark suppressing purposes.

If, while the motor is operating, it becomes desirable to regulate or adjust the governor to maintain the motor at a different speed, the attendant may make the adjustment by grasping and holding the projecting end of pin 28 to prevent its rotation and moving the pin 28 longitudinally within the shaft 8 until one of the worms 29 or 30 meshes with the gear 26. As gear 26 which is mounted on rotating disc 3 moves in its orbit around the now stationary worm and pin 28 a rotary movement is imparted to gear 26, the direction of which depends on which worm is meshed therewith. Since gear 26 has screw threaded engagement with the screw member 25, which cannot rotate about its axis because of its connection to arm 33, axial motion is imparted to the screw member 25 in either a right or left direction (Fig. 3).

If the attendant pulls pin 28 out worm 29 meshes with gear 26, as shown in Fig. 4 and the gear 26 turns in a counterclockwise direction but because it cannot move axially it will shift the screw member 25 with which it has screw threaded engagement to the right in Figure 3. The end 32 of tensioning arm 33 also will be moved to the right in Figure 3 and thereby decrease the tension on the spring 35 which will permit movable contact 14 to disengage contact 13 when the motor 1 is running at a slower speed and, as explained above, the motor will be maintained at the slower speed.

If it is desired to set the governor to maintain the motor at a higher rate of speed, the attendant may grasp the pin 28 and push it in until worm 30 meshes with gear 26 as shown in Fig. 5. The gear 26 moving around the worm 30 will now shift the screw member 25 axially to the left in Fig. 3 which will move the tension arm 33 to the left to increase the tension on spring 35. This tensioning increase necessitates a greater centrifugal force, i. e. higher speed, to separate the contacts 13 and 14 to regulate the power supply of the motor and consequently the motor will be maintained at a higher rate of speed.

In the present embodiment of my invention the teeth of gear 26 and worms 29 and 30 are so related that gear 26 will be rotated about its axis only one tooth for each complete revolution that gear 26 makes around the pin 28, that is during each revolution of shaft 2. Excess movement of screw member 25 is prevented by the cotter pin 40 and end 32 of arm 33.

As soon as the motor shaft 2 reaches the desired speed, which may be determined by the use of a tuning fork or stroboscope in conjunction with the dots on the speed target on cover 38 in a well known manner, the attendant simply releases pin 28 which will prevent any further movement of gear 26. The weight of the entire pin 28 is not sufficient to rotate gear 26. The pin 28 must be held stationary to make an adjustment.

I have therefore provided a simple, inexpensive speed regulation mechanism which may be adjusted during rotation of the shaft whose speed is to be regulated. The adjustment is normally operatively disconnected since contact of either worm 29 and 30 with gear 26 will not affect the adjustment unless pin 28 is held against rotation. The adjustment is reliably maintained over a long period since it avoids the use of constantly wearing parts such as were employed in earlier governors. The temporary meshing of the worms and gear 26 to effect the adjustment gives rise to little or no wear so that the life of the adjustment mechanism is very great.

It is to be understood that the above described invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and scope of the claims are intended to be embraced therein.

What is claimed as new and desired to be secured by United States Letters Patent is:

1. A variable speed governor comprising a rotatable shaft, a movable contact spring tensioning member, a rotatable adjustment control gear operably connected to said member and moved in a path by said shaft, and a second gear adapted to be meshed with said control gear and held stationary with respect to said shaft to adjust said tensioning member during rotation of said shaft.

2. A variable speed governor comprising a rotatable shaft, a movable contact spring tensioning member, a gear rotatable with said shaft in a path about the axis of said shaft, and a second gear within said shaft adapted to be engaged with said first gear and held against rotative movement to thereby adjust said tensioning member during rotation of said shaft.

3. A variable speed governor comprising a rotatable shaft, a support carried by said shaft, a centrifugal switch on said support, a control gear mounted on said support to rotate about its own axis and also with said shaft in a path around said shaft, a set of worm gears mounted within said shaft adapted to selectively mesh with said control gear, and a spring tensioning member operably connected to said control gear and to said centrifugal switch.

4. A variable speed governor comprising a rotatable shaft, a support carried by said shaft, a movable contact on said support, a tensioning member for said contact, a co-operating mechanism on said shaft and support engageable during rotation of said shaft to actuate said tensioning member to adjust the tension on said movable contact.

5. In a governor of the character described, a fixed contact, a movable contact engageable with said fixed contact, tensioning means for said movable contact, a screw member operably connected to said tensioning means, a gear carried by said screw member for controlling the movement of said screw member, and a second gear movable into engagement with said first gear to actuate said first gear to move the screw member and thereby adjust the tension on said movable contact.

6. In a variable speed governor, a driven shaft, a control device operably connected to regulate the speed of said shaft and comprising relatively stationary and movable contacts spring biased to closed position and openable by movement of said movable contact under centrifugal force when said shaft reaches a predetermined speed of rotation, a spring tension adjustment member, and a manually operable mechanism for actuating said adjustment member through energy derived from rotation of said shaft.

7. The speed governor defined in claim 6, wherein said adjustment mechanism is normally operably disconnected during shaft rotation.

8. In a variable speed governor, a rotatable shaft, a support fixed on said shaft, a member rotatable about an axis transversely of the shaft axis and mounted on said support for movement in an orbit about the shaft axis, a centrifugal switch on said support operably connected to said member, and a mechanism selectively operable during rotation of said shaft for rotating said member to vary controlling action of said switch.

9. In a variable speed governor, a rotatable shaft, a support fixed to said shaft, a fixed contact on said support, a movable contact on said support, a spring biasing said movable contact against movement under centrifugal force to separate said contacts, a pivoted arm on said support connected to said spring, a reciprocable member on said support connected to actuate said arm, a control element rotatably mounted on said support and having an operative motion transmitting connection to said reciprocable member, and a manually operable mechanism for rotating said control element during rotation of said shaft.

10. In a variable speed governor; a rotatable shaft; a support member mounted on said shaft for rotation therewith; a pair of switch contacts mounted on said support, one of said contacts being relatively movable subject to centrifugal forces as said support rotates; an arm member pivoted on said support; spring biasing means connecting said arm member and said relatively movable contact to normally hold said contacts in engagement against the action of the centrifugal forces; a reciprocable member on said support operably connected to said arm member; a control member rotatably engaging said reciprocable member and adapted to impart reciprocating motion thereto; and means selectively operable to cause rotation of said control member during rotation of said shaft, whereby said reciprocable and arm members are selectively positioned to adjust the tension on said spring biasing means.

11. In a variable speed governor; a rotatable shaft; a support member mounted on said shaft for rotation therewith; a centrifugal switch mechanism comprising a first contact fixed on said support, a contact arm movable relative to said support and subject to centrifugal forces as said support rotates, and a second contact mounted on said contact arm; an adjustably positionable arm member pivoted on said support; a tension spring connecting said contact arm with said arm member to normally hold said second contact in engagement with said first contact against the action of the centrifugal forces; a screw member mounted for reciprocable movement on said support and operably engaged with said arm member; a gear element mounted on said screw member and adapted to impart reciprocable motion thereto; and a selectively operable normally disconnected mechanism adapted to operatively engage and rotate said gear element during rotation of said shaft, whereby said gear element imparts reciprocable movement to said screw member to adjust the position of said arm member and tension of said spring.

CARL P. ANDERSON.

REFERENCES CITED

The following references are of record in the file of this patent:

UNITED STATES PATENTS

| Number | Name | Date |
| --- | --- | --- |
| 1,925,883 | Smith | Sept. 5, 1933 |
| 1,982,000 | Griffith | Nov. 27, 1934 |
| 2,326,508 | Whitcomb et al. | Aug. 10, 1943 |
| 2,460,501 | Hallewell | Feb. 1, 1949 |
| 2,503,946 | Hallett | Apr. 11, 1950 |